Oct. 22, 1935.    E. E. HINDMAN    2,018,210
CONDENSER STRUCTURE
Filed May 29, 1930    3 Sheets-Sheet 1
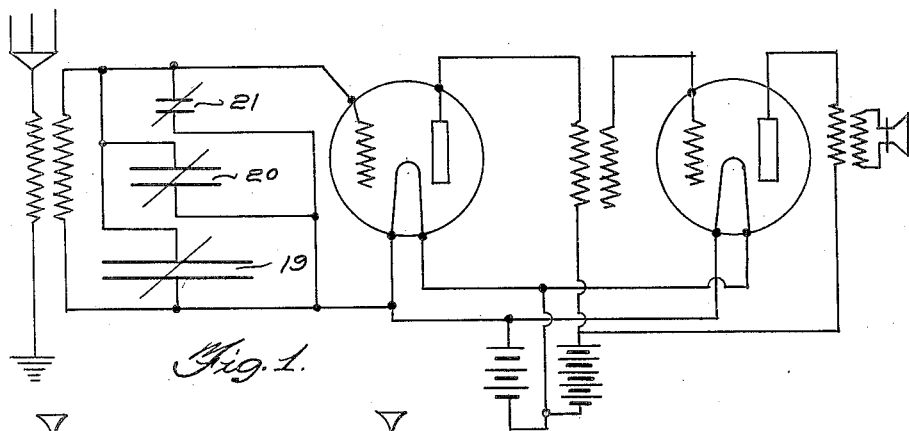
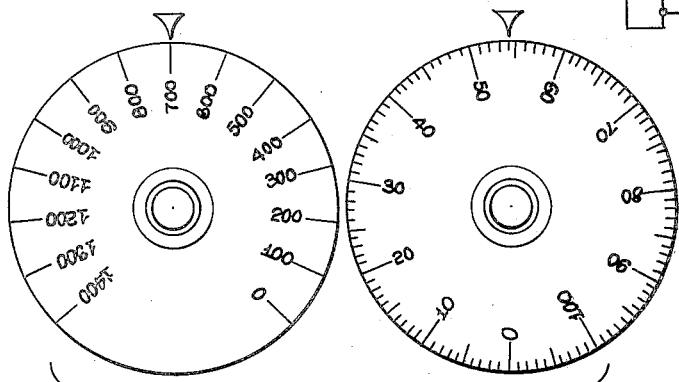
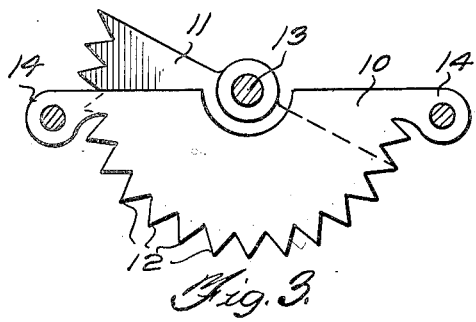
*INVENTOR:*
*EARL E. HINDMAN,*
BY *H S Woodward,*
*ATTORNEY.*

Oct. 22, 1935.  E. E. HINDMAN  2,018,210
CONDENSER STRUCTURE
Filed May 29, 1930   3 Sheets-Sheet 2

INVENTOR:
EARL E. HINDMAN,
BY H. L. Woodward,
ATTORNEY.

INVENTOR:
EARL E. HINDMAN,
BY
ATTORNEY.

Patented Oct. 22, 1935

2,018,210

UNITED STATES PATENT OFFICE 2,018,210

CONDENSER STRUCTURE

Earl E. Hindman, Washington, D. C.

Application May 29, 1930, Serial No. 457,206

3 Claims. (Cl. 175—41.5)

In one aspect the invention seeks the extremely simple attainment of causing the tuning action of devices in receivers to respond so sharply when the adjustment of a tuning condenser is correct, that variations from the adjustment in either direction will cause multiplied effect denoting the change from the maximum response of the set, so that the user may easily turn the knob or dial back to and locate the proper position.

Another aspect of the invention, is an aim to enable the user, given the known kilocycle frequency of the carrier wave of a station which it is desired to receive signals from, to set the dials by an arithmetic operation, requiring no acute perspicacity on the part of the user to determine when the adjustment is correct.

As to the first aspect, present devices are unsatisfactory because in the tuning operation, when the capacity of the condenser is closely approaching the maximum required for the tuning of a receiver of radio signals, for instance, the variation in volume of sound from the telephone of the receiver, which the user must observe in order to know when the set is tuned, varies so slightly that many, in fact the majority, of persons can not promptly determine when the proper adjustment has been reached, and they move the adjusting devices beyond and back from the ideal position without being able to stop the movement at the exact medial position desired. My invention makes the tuning effective by an increase in volume for each stage of capacity, which may correspond to individual stations within range of a set that ascends with great rapidity for a slight movement of the adjusting knob, and may be represented by a curve ascending at a marked inclination, as compared to the increase produced in ordinary tuning devices, which may be represented by a line of diminished inclination. Yet my device permits the use of the same general form of condensers and operating devices as heretofore employed. Likewise, when the maximum capacity for tuning a given station has been attained in adjustment of the device, any further movement beyond the ideal position will produce a marked cessation of acceleration of capacity increase, or may produce actually a decrease of capacity which may be represented by a line descending from the line representing the increase of capacity up to the maximum.

In regard to the second aspect of the invention, it is familiar to mark dials of tuning devices in receivers with a scale calibrated in relation to the kilocycle frequency of the carrier waves which the receiver is capable of being tuned to, but, with moderate sized dials the units on the scale are so coarse (so many kilocycles to the unit) that an accurate tuning by setting of the pointer on a dial has never been practicable. One or two local stations will often be tuned if a kilocycle setting is attempted in receivers now largely on the market with sufficient clearness of either to enable reception by manipulation of volume controls, but such settings are far from ideal for the reason first stated, and involve much sacrifice of efficiency of the set.

My invention is inclusive of means to synchronize successive abrupt increases of capacity in variable condensers with respective tunings of carrier waves of different stations.

It seeks to provide a variable condenser which in successive stages of movement at capacities coincident with resonance to predetermined frequencies, the capacities will decrease or remain stationary during further portions of movement of the control in the direction which would normally produce increase of capacity, and after this further movement of the condenser will abruptly increase in capacity to resonance with the next higher kilocycle reading or unit which the condenser is adapted to tune.

Applicant's invention is of course applicable to use in various situations where condensers are required, and where sharp definition of capacity in a variable device is required. It is therefore particularly useful in resonating cyclic, pulsating, or alternating electrical currents or impulses.

Additional objects, advantages, and features of invention will be understood from the following specification and claims, and from the accompanying drawings forming a part of this application, in which Figure 1 is a diagram of a circuit showing use of my invention, Figure 2 is an elevation of the dials which may be used in one manner of applying my invention to use, while another involving a single dial is not illustrated, as being obvious. The left hand and right hand dials of this figure would be connected to the rotors of the condensers at the right and left of Figures 10 and 11.

Figure 3 is a view of a condenser constructed in accordance with my invention, a portion being broken away.

Figure 4:
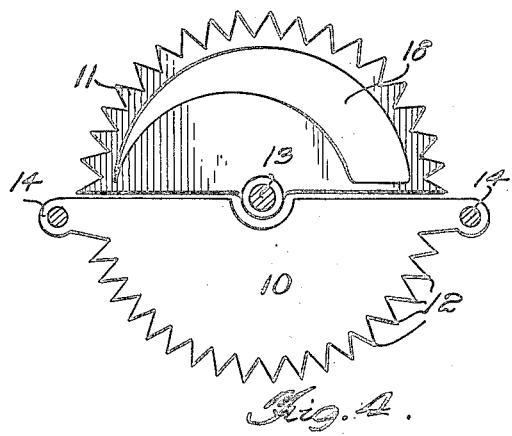
Figure 4 is a view of a "straight-line" condenser embodying my invention.

There is illustrated a condenser comprising a stator portion 10, and a rotor part 11, both of which may be made up and mounted in accordance with practices familiar in the art. The plates of the stator and rotor may also correspond in general outline to the various forms heretofore employed, but they have peculiarly formed edge portions or additions, by which the tuning effect of the device is notably affected. In Figure 3 the edges are toothed with elongated pyramidal teeth 12 on the curved sides, these being in a series concentric with the shaft 13 on which the rotor is mounted. The stator and rotor plates are similarly formed, and the teeth are preferably at an interval corresponding to a unit of capacity of a certain kilocycle tuning effect. That is to say, when the condenser has been adjusted in one position with the points of the rotor alined with those of the stator, turning of the rotor so as to effect successive alinement of the teeth of the intermeshed parts again, will increase the capacity of the condenser sufficiently to tune or resonate a carrier wave of a given frequency higher than that to which the condenser was resonated in its last previous stage of movement. The increase would preferably be advanced from the frequency last resonated a unit of kilocycles corresponding to the kilocycle intervals in the wave bands allotted a class of stations for which the receiver is adapted to function.

In order to mount the stator plates, they may be provided with suitable ears 14 or other means by which they may be secured in alined spaced relation, so as to permit the plates of the rotor to pass between them in the proper spaced relation.

On account of the fact that as the semi-circular rotor plates enter between the stator plates in initial stages, the area of the moderate sized points on the two sets which are alined will be much less than the unit area of the plate between the corresponding radii, there might not be a drop of volume in a resonated signal as the rotor plates are advanced further and the spurs thereon moved out of alinement with these of the stator plates. Consequently it is desirable, in order to produce the drop effect between successive stages of capacity, to have a sufficient number and area of points on the rotor and stator plates intermeshed at all times to equal at least one unit of area represented between the radii of two proximal points.

In order to accomplish this last purpose, in one use of my invention (shown in Fig. 6), I provide a concentric extension 15 from each rotor plate at the periphery, which consists principally of a series of points like those on the body of the plate with just sufficient additional material to properly connect them. The stators may be similarly constructed, and if desired rotor plates similar to those of Fig. 3 may be used with this form of stator.

Figure 6:
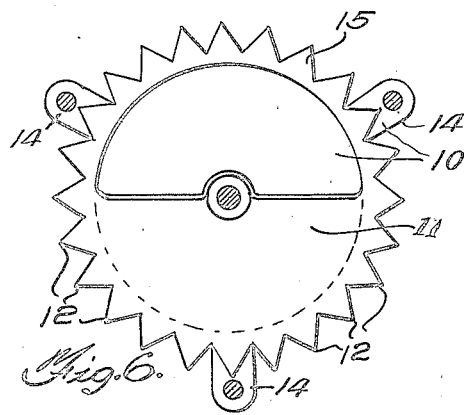
Figure 6 is a view similar to Fig. 3, of a further improved condenser embodying my invention.
Figure 11:
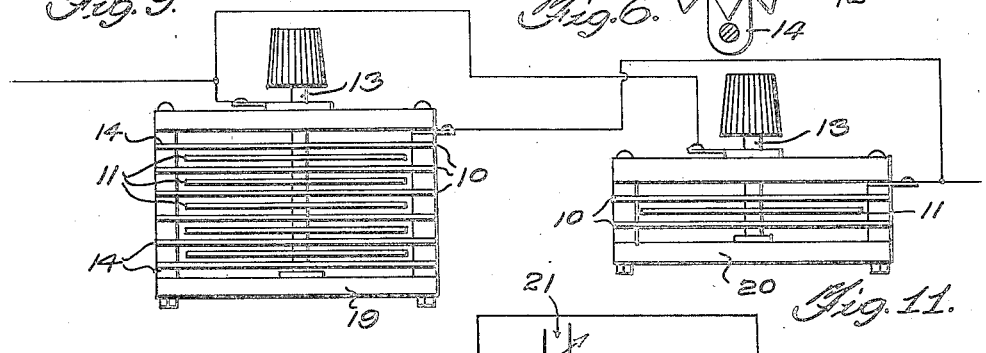
Figure 11 is an edge view of the two condensers last mentioned.
Figure 10:
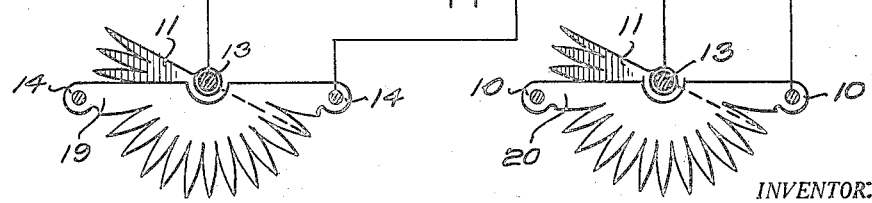
Figure 10 is a view of the two condensers constructed to function with the dials shown in Figure 2, with the circuit connections indicated.

It can be seen that the aggregate of the areas of the salients 12 in the structure of Fig. 6 is greater than the area of the sector between the apices of any two salients. As a result, when the body portions of two plates are moving into lapped relation from one position where the salients are alined, a greater area of the salients is moving out of lap, so that a drop of capacity is manifest until the two sets of salients have moved to medial staggered relation, when there will be an accentuated increase of capacity as the two sets of salients move toward alinement. This increase of capacity from staggered position to alined position will be also at a much greater rate than the mean increase of capacity from one position of alinement to another, or from zero to maximum capacity of the condenser, so that pronounced fluctuations will occur serving as modulations or articulations to distinguish and accentuate particular capacities sharply throughout the range of the condenser.

Figure 7:
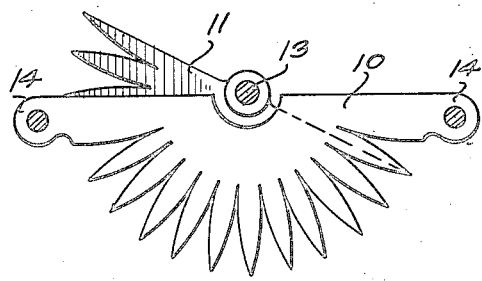
Figures 7, 8 and 9 are similar views of respective further modifications.
Figure 8:
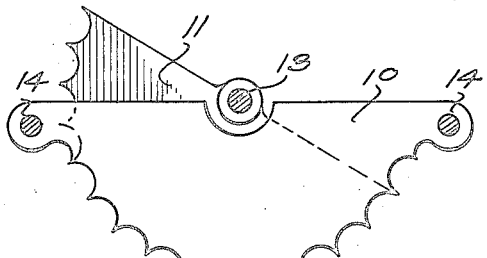
Figure 9:
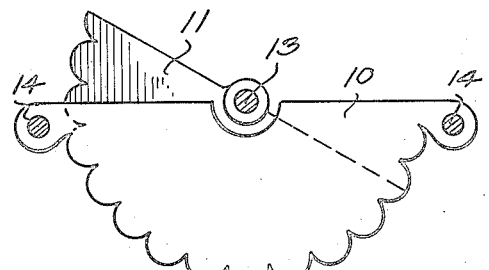

In Figures 7 to 9 other modifications of the edge irregularities of the plates are illustrated, which it may be desirable to employ in particular situations.

In the use of a single condenser comprising my invention, it may be connected in the circuits of radio receivers in the same manner as other variable condensers.

In case it is desired to retain the relationship of parts shown in Figures 3 and 6, and also the straight-line capacity or frequency resonating reading, the rotor plates may be cut out in the first parts to enter between the stator plates, substantially as shown at 18 in Figure 4.

As shown in Figures 1, 2, 10 and 11, two condensers 19—20 embodying my invention may be connected in the situation where an ordinary variable condenser has heretofore been connected. One of them will have a sufficient number of plates to raise the resonating capacity in stages of, say, fifty kilocycles, while the other will have a smaller number of plates, and will advance the resonating capacity in stages of one kilocycle, or more.

The capacities and the coil windings are to be such that when the two condensers are adjusted with the points of rotors and stators alined, a carrier wave of a given frequency will be resonated, and the plates should be so proportioned and the points of such size that when the rotors are moved to the next successive positions with the points alined, another wave of proportionately different frequency will be resonated. The dials being calibrated to correspond with the effect of the plates, in order to tune a receiver equipped therewith, it is only necessary to set the dials so that the sum of the numbers indicated by the pointers will equal the kilocycle frequency of the station wave which it is desired to receive.

In order to insure accurate coincidence of the point alinement and the maximum resonance with the desired wave frequencies, a variable micro-condenser 21 may also be connected with the larger ones, or other varying means provided to the same end. This is to be set at a permanent adjustment when its proper effect is manifest.

In order to more pronouncedly accentuate the tuning, the condenser plates may be in the form of a rosette, the petalated portions being of considerable depth, as shown in Figure 7.

Figure 5:
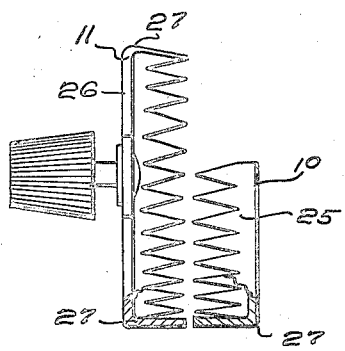
Figure 5 is an edge view of a stator and rotor plate in a modification of the invention, partly in section.

In order to produce very sharp tuning with exceedingly fine graduations and pronounced falling capacity between each successive stage of tuning, I may form a condenser after the principle and construction shown in Figure 5. Here both stator 25 and rotor 26 have properly spaced salients at their peripheries and on one of these at least, the edge portion of the plate is turned laterally as at 27 into spaced opposed relation to the adjacent plate of the other member of the condenser and so that the points of one plate may move in an arc very close to that of the points of the opposed one. The capacity effect between the bodies of the plates in this instance is low, and the effect desired is produced principally by the tension between the opposed points of the members.

I claim:—

1. A condenser comprising stator and rotor plates, each comprising a body portion for substantial capacity effects, and each plate having radial projecting salient members parallel to and spaced uniformly along the path of relative movement of the plates whereby the salients of the rotor will move into and out of registry with those of the stator repeatedly during movement of the rotor from one extreme to the other, the plates and salients being constructed and proportioned so that the aggregate area of registered salients of rotor and stator at any time will at least equal the area of a unit of segments in all plates comprised within the projected base of one salient.

2. A condenser comprising a stator member and a rotor member having plates movable in parallel into and out of lap positions, each plate including a body portion of substantial size and an outer concentric part having a multiplicity of salients uniformly spaced and arranged to coact capacitatively with the salients of adjacent plates of opposite potential, the concentric part of at least one of said first named two members being extended over an arc of 360 degrees forming an arcuate element with said body portion at its base.

3. A condenser plate for condensers of the character described, comprising a body portion and having a linear series of step distinguishing salients arranged to line in alinement with the path of movement relatively of similar salients of a like plate in a condenser, and to coact capacitatively with such like plate of opposite potential, and including a member extended materially beyond the body of the plate in said path and having a multiplicity of systematically spaced salients thereon forming a continuation of the series on the body portion.

EARL E. HINDMAN.